(12) United States Patent
Wang (10) Patent No.: US 8,510,533 B2
(45) Date of Patent: Aug. 13, 2013

(54) METHOD OF MANAGING DATA ON A NON-VOLATILE MEMORY

(75) Inventor: Hongyu Wang, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 844 days.

(21) Appl. No.: 12/517,062

(22) PCT Filed: Dec. 27, 2006

(86) PCT No.: PCT/CN2006/003616
§ 371 (c)(1),
(2), (4) Date: Feb. 22, 2010

(87) PCT Pub. No.: WO2008/077285
PCT Pub. Date: Jul. 3, 2008

(65) Prior Publication Data
US 2012/0124315 A1    May 17, 2012

(51) Int. Cl.
*G06F 12/08*    (2006.01)
(52) U.S. Cl.
USPC ............................ 711/209; 711/103; 711/221
(58) Field of Classification Search
None
See application file for complete search history.

(56) References Cited

U.S. PATENT DOCUMENTS

| | | | |
|---|---|---|---|
| 5,717,886 A | 2/1998 | Miyauchi | |
| 5,963,983 A * | 10/1999 | Sakakura et al. | ............. 711/202 |
| 7,139,864 B2 | 11/2006 | Bennett et al. | |
| 7,174,440 B2 | 2/2007 | Chang et al. | |
| 2005/0246480 A1 * | 11/2005 | Fu | ................................. 711/103 |
| 2006/0004950 A1 | 1/2006 | Wang et al. | |
| 2006/0179263 A1 | 8/2006 | Song et al. | |
| 2006/0184719 A1 | 8/2006 | Sinclair | |
| 2006/0271727 A1 | 11/2006 | Wang et al. | |

FOREIGN PATENT DOCUMENTS

| | | |
|---|---|---|
| CN | 1805049 | 7/2006 |
| DE | 10321104 A1 | 11/2004 |
| JP | 2006216036 | 8/2006 |
| KR | 10-2004-0038708 A | 5/2004 |
| KR | 10-2006-0130085 A | 12/2006 |
| WO | WO-2008/077285 A1 | 7/2008 |

OTHER PUBLICATIONS

Notice of Preliminary Rejection for Korean Patent Application No. 2009-7013272, Mailed Dec. 20, 2010, 1 page.
Yu, Wenfang, Written Opinion of the International Searching Authority, Patent Cooperation Treaty, Sep. 18, 2007, 4 pages, International application No. PCT/CN2006/003616, The State Intellectual Property Office, the P.R. China, Beijing, China.

(Continued)

*Primary Examiner* — Gary Portka
(74) *Attorney, Agent, or Firm* — Kacvinsky Daisak PLLC (57) ABSTRACT

Machine-reading media and method for managing data in a non-volatile memory. The method comprises the steps: a plurality of first logical offsets may be assigned to a plurality of first fragments of a first memory block, a first fragment of the plurality of first fragments may store data; a plurality of second logical offsets may be assigned to a plurality of second fragments of a second memory block, a second fragment of the plurality of second fragments may be associated with the first fragment, a second logical offset assigned to the second fragment may be identical to a first logical offset assigned to the first fragment; then, data may be copied from the first fragment to the second fragment.

14 Claims, 6 Drawing Sheets

(56) References Cited

OTHER PUBLICATIONS

Moyse, Ellen, International Preliminary Report on Patentability, Patent Cooperation Treaty, Jun. 30, 2009, 5 pages, International application No. PCT/CN2006/003616, The International Bureau of WIPO, Geneva, Switzerland.

Office Action for German Patent Application No. 11 2006 004 185.1 mailed Aug. 30, 2010, 10 pages.

Office Action received for German Patent Application No. 11 2006 004 185.1, mailed on Oct. 10, 2011, 7 pages including 3 pages of English Translation.

Office Action received for Korean Patent Application No. 2009-7013272, mailed on Aug. 29, 2011, 5 pages of English Translation.

Office Action received for Japanese Patent Application No. 2009-543320, mailed on Nov. 1, 2011, 10 pages including 5 pages of English Translation.

Office Action received for German Patent Application No. 11 2006 004 185.1, mailed on May 24, 2012, 5 pgs English translation.

\* cited by examiner

Block 0

| Logical offset | | Physical offset |
|---|---|---|
| $0_l$ | Block_LPOMT_0 | $0_p$ |
| $1_l$ | File link table | $1_p$ |
| $2_l$ | Other data | $2_p$ |
| $3_l$ | | $3_p$ |
| $4_l$ | | $4_p$ |
| $5_l$ | File_segment_1 | $5_p$ |
| $6_l$ | Other data | $6_p$ |
| $7_l$ | | $7_p$ |
| $8_l$ | | $8_p$ |

Block 1

| Logical offset | | Physical offset |
|---|---|---|
| $0_l$ | Block_LPOMT_1 | $0_p$ |
| $1_l$ | Dirty data | $1_p$ |
| $2_l$ | File_segment_2 | $2_p$ |
| $3_l$ | Dirty data | $3_p$ |
| $4_l$ | Dirty data | $4_p$ |
| $5_l$ | Dirty data | $5_p$ |
| $6_l$ | File_segment_3 | $6_p$ |
| $7_l$ | File_segment_4 | $7_p$ |
| $8_l$ | Dirty data | $8_p$ |

Block 2

| Logical offset | | Physical offset |
|---|---|---|
| $0_l$ | Block_LPOMT_2 | $0_p$ |
| $2_l$ | File_segment_2 | $1_p$ |
| $6_l$ | File_segment_3 | $2_p$ |
| $7_l$ | File_segment_4 | $3_p$ |
| $1_l$ | empty | $4_p$ |
| $3_l$ | empty | $5_p$ |
| $4_l$ | empty | $6_p$ |
| $5_l$ | empty | $7_p$ |
| $8_l$ | empty | $8_p$ |

| block | Logical block address | Physical block address |
|---|---|---|
| 0 | $0'_l$ | $0'_p$ |
| 1 | $1'_l$ | $1'_p$ |
| ..... | ..... | ..... |

*FIG. 4*

| File | Logical block address | Logical offset address |
|---|---|---|
| File_segment_1 | $0'_l$ | $6_l$ |
| File_segment_2 | $1'_l$ | $2_l$ |
| File_segment_3 | $1'_l$ | $6_l$ |
| File_segment_4 | $1'_l$ | $7_l$ |
| ..... | ..... | ..... |

*FIG. 3*

| LPOMT_0 | |
|---|---|
| Logical offset | physical offset |
| $0_l$ | $0_p$ |
| $1_l$ | $1_p$ |
| $2_l$ | $2_p$ |
| $3_l$ | $3_p$ |
| $4_l$ | $4_p$ |
| $5_l$ | $5_p$ |
| $6_l$ | $6_p$ |
| $7_l$ | $7_p$ |
| $8_l$ | $8_p$ |

FIG. 5A

| LPOMT_1 | |
|---|---|
| Logical offset | physical offset |
| $0_l$ | $0_p$ |
| $1_l$ | $1_p$ |
| $2_l$ | $2_p$ |
| $3_l$ | $3_p$ |
| $4_l$ | $4_p$ |
| $5_l$ | $5_p$ |
| $6_l$ | $6_p$ |
| $7_l$ | $7_p$ |
| $8_l$ | $8_p$ |

FIG. 5B

| LPOMT_2 | |
|---|---|
| Logical offset | physical offset |
| $0_l$ | $0_p$ |
| $2_l$ | $1_p$ |
| $6_l$ | $2_p$ |
| $7_l$ | $3_p$ |
| $1_l$ | $4_p$ |
| $3_l$ | $5_p$ |
| $4_l$ | $6_p$ |
| $5_l$ | $7_p$ |
| $8_l$ | $8_p$ |

METHOD OF MANAGING DATA ON A NON-VOLATILE MEMORY

CROSS REFERENCE TO RELATED APPLICATION

This patent application is a U.S. National Phase application under 35 U.S.C. §371 of International Application No. PCT/CN2006/003616, filed on Dec. 27, 2006, entitled METHOD OF MANAGING DATA ON A NON-VOLATILE MEMORY.

BACKGROUND

Non-volatile memory products for electronic equipments, such as NOR flash memory and NAND flash memory, are widely used. A non-volatile memory may comprise a plurality of memory blocks, while each block may comprise a plurality of data fragments. Normally, segments of a file may each be stored into separate fragments of the non-volatile memory. Therefore, a file linking table may be used to link the file segments together by storing the memory address of the fragments. The memory address may include an address of a block that a fragment belongs to and an offset of the fragment within the block.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes techniques for a method of managing data on a non-volatile memory. In the following description, numerous specific details such as logic implementations, pseudo-code, means to specify operands, resource partitioning/sharing/duplication implementations, types and interrelationships of system components, and logic partitioning/integration choices are set forth in order to provide a more thorough understanding of the present invention. However, the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; and others.

Figure 1:
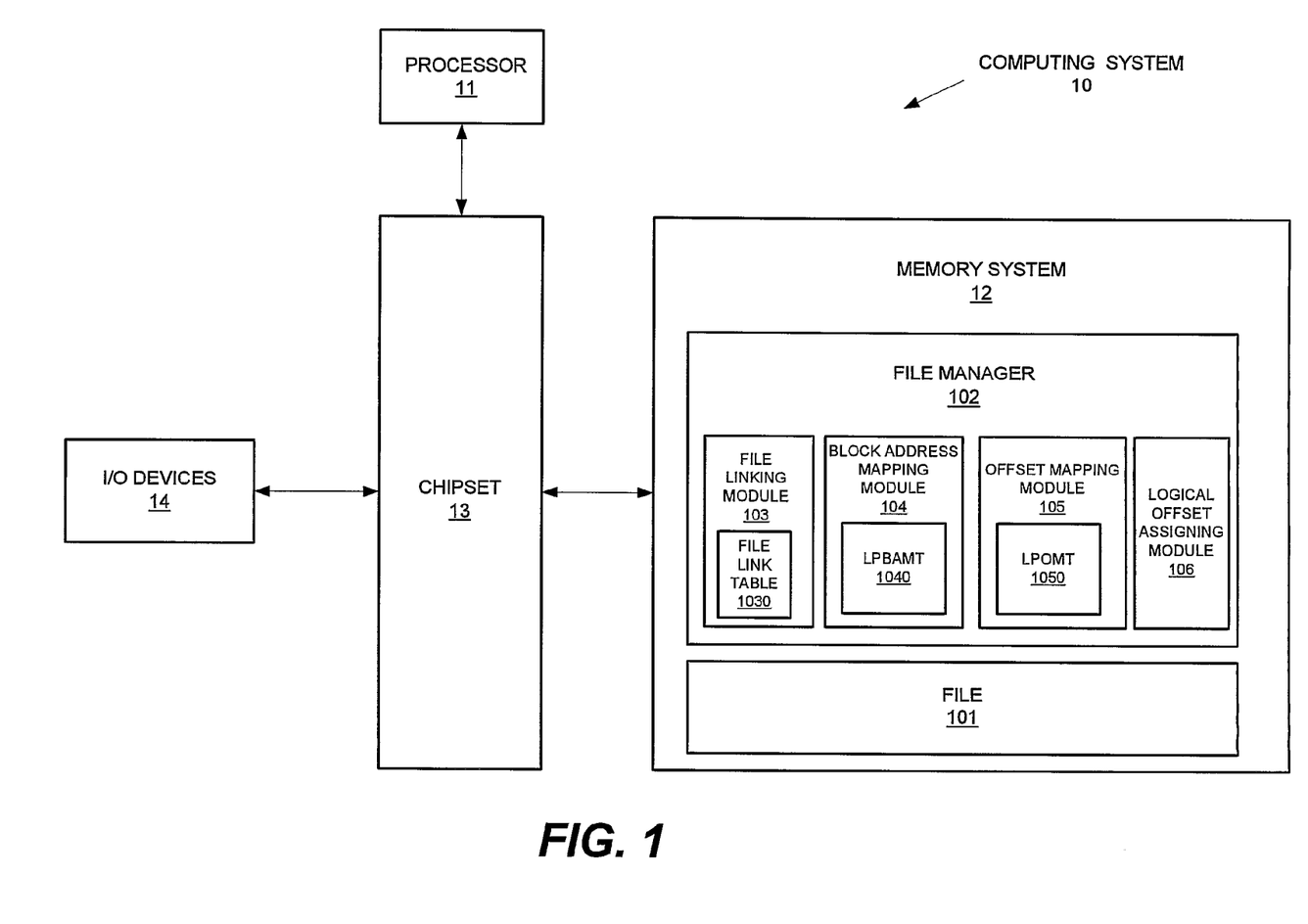
FIG. 1 illustrates a computing platform comprising a file manager to manage a file stored in a memory system of the computing platform.

FIG. 1 shows an embodiment of a computing system: As shown, the computing system 10 may comprise one or more processor 11, memory system 12, chipset 13, I/O devices 14, and possibly other components. Examples for the computing system 10 may comprise a cell phone, a digital camera, a computer and other devices for processing and storing data.

One or more processors 11 may be communicatively coupled to various components (e.g., the chipset 13) via one or more buses such as a processor bus. Processors 11 may be implemented as an integrated circuit (IC) with one or more processing cores that may execute codes under a suitable architecture, for example, including Intel® Pentium™, Intel® Itanium™, Intel® Core™ Duo architectures, available from Intel Corporation of Santa Clara, Calif.

Memory system 12 may comprise one or more memory devices (not shown) that may be or may not be of the same type. For example, some of the memory devices may be non-volatile memory devices, while some others may be volatile memory devices. Examples of the non-volatile memory devices may comprise NOR flash memory devices and NAND flash memory devices. Examples of the volatile memory devices may comprise synchronous dynamic random access memory (SDRAM) devices, RAMBUS dynamic random access memory (RDRAM) devices, double data rate (DDR) memory devices and static random access memory (SRAM). A memory device may comprise a plurality of memory blocks and each memory block may comprise a plurality of data fragments.

Memory system 12 may store instructions and data as a file 101 and a file manager 102. File 101 may comprise a plurality of file segments that may each be stored on separate places of the memory system. For example, different file segments may be stored in different memory blocks or even different data fragments within one memory block.

File manager 102 may comprise a file linking module 103, a block address mapping module 104, an offset mapping module 105, a logical offset assigning module 106 and possibly other components for managing file 101. File linking module 103 may setup and maintain a file linking table 1030 for file 101 in order to link the file segments stored in separate places of the memory system 12 together.

Figure 3:
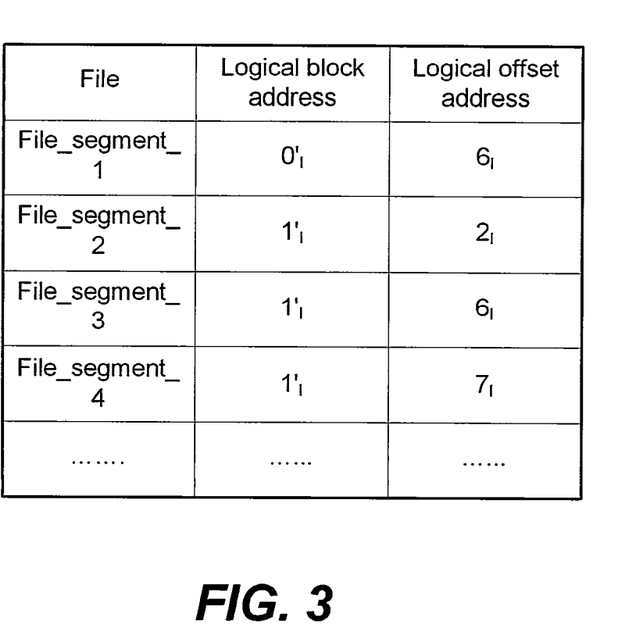
FIG. 3 illustrates an embodiment of a file linking table for the file.

FIG. 3 shows an embodiment of file linking table 1030. As shown, the file linking table may comprise a plurality of entries, each entry for each file segment. Each entry may store a logical block address of a block having a data fragment storing a file segment and a logical offset of the data fragment within the block. In lieu of this, the logical block address of the block and the logical offset of the data fragment may indicate a logical address of the data fragment.

Figure 4:
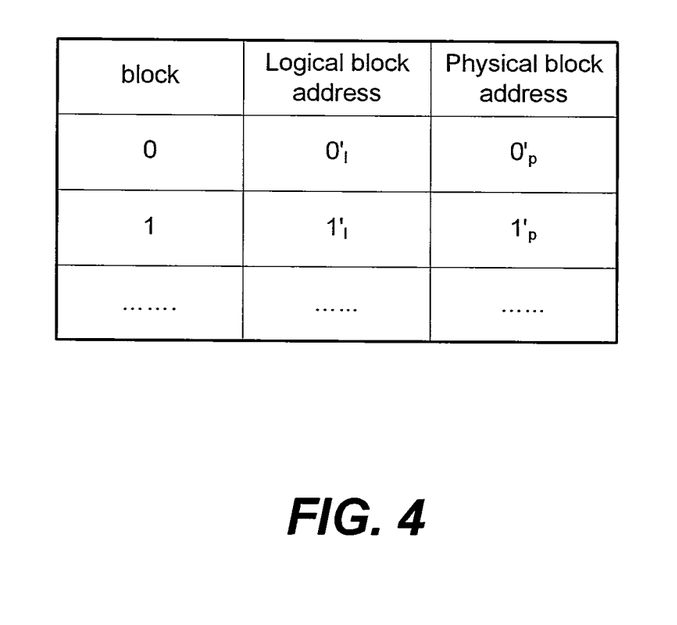
FIG. 4 illustrates an embodiment of a logical to physical block address mapping table (LPBAMT) for memory blocks of the memory system.

Block address mapping module 104 may setup and maintain a logical-to-physical block address mapping table (LP-BAMT) 1040. LPBAMT 1040 may comprise a plurality of entries, each entry for each block that may have a data fragment storing a file segment. FIG. 4 shows an embodiment of the LPBAMT 1040. As shown, each entry of LPBAMT 1040 may map a logical block address to a physical block address for each block storing the file.

Figure 5A:
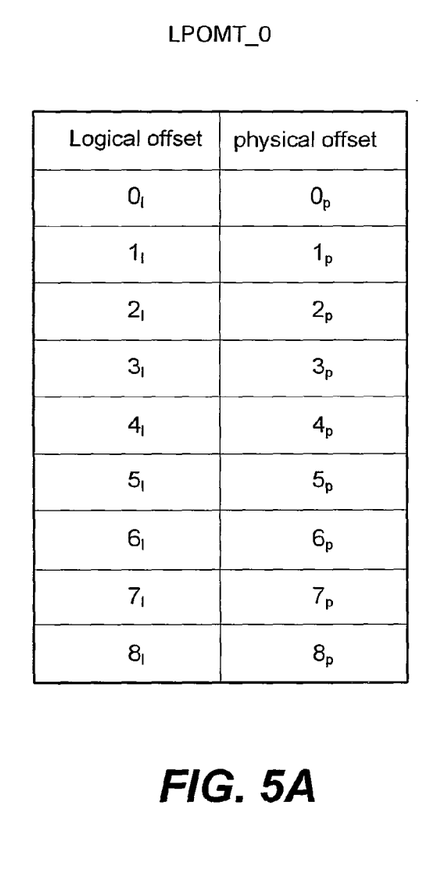
FIGS. 5A-5C respectively illustrate an embodiment of a logical to physical offset mapping table (LPOMT) for fragments of a memory block of the memory system.
Figure 5B:
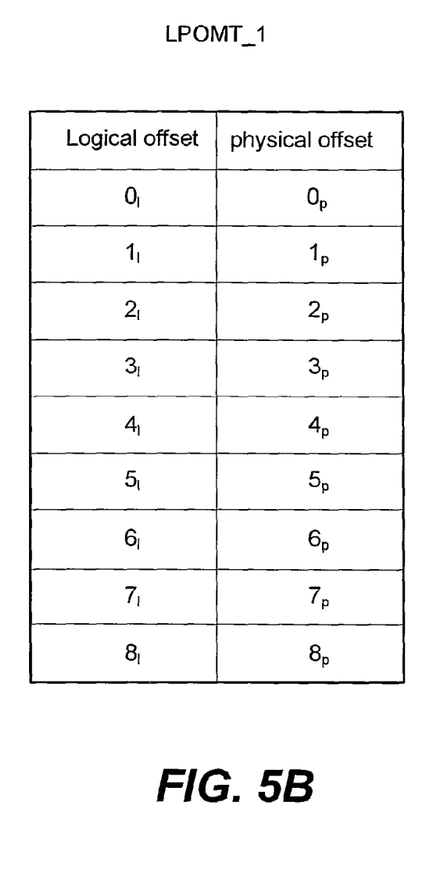
Figure 5C:
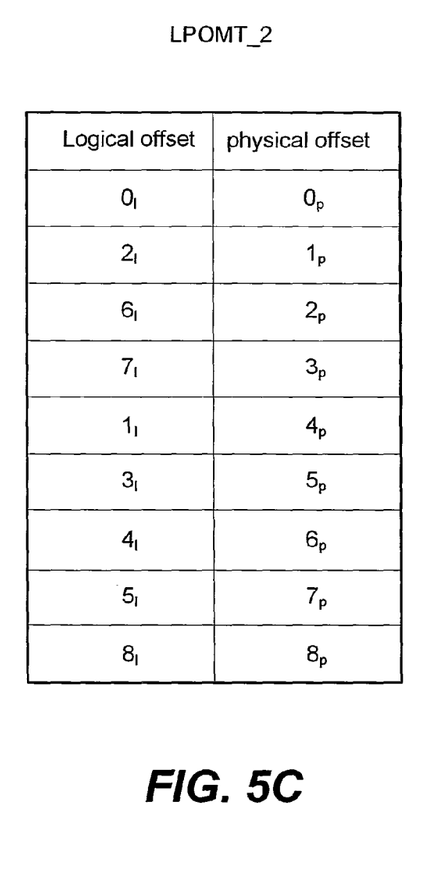

Offset mapping module 105 may setup and maintain a logical-to-physical offset mapping table (LPOMT) 1050 for each block storing the file. LPOMT 1050 may comprise a plurality of entries, each entry for each data fragment of the block. FIGS. 5A-5C show three LPOMTs for three blocks. As shown, each entry of LPOMT 1050 may map a logical offset to a physical offset for each data fragment.

Logical offset assigning module 106 may assign a logical offset to each data fragment of a block.

In order to read file 101, file linking table 1030 may help file manager 102 to obtain logical addresses of the data fragments storing the segments of file 101. LPBAMT 1040 and LPOMT 1050 may help file manager 102 to obtain physical addresses of the data fragments according to the logical addresses in file linking table 1030.

In order to reclaiming an old block having an old fragment storing a file segment, memory system 12 may assign a new block to replace the old block before the reclamation. Then, logical offset assigning module 106 may assign logical offsets to new fragments of the new block. Particularly, logical offset assigning module 106 may assign a logical offset to a new fragment that is identical to the logical offset assigned to the old fragment, if the new fragment is selected to store the file segment copied from the old fragment.

Offset mapping module 105 may build a new LPOMT for the new block based upon the logical offsets assigned to the new data fragments. Block address mapping module 104 may update LPBAMT 1040 by changing a physical address of the old block into a physical address of the new block. After the file segment is copied from the old fragment into the new fragment, the old block may be erased and the new block may be able to replace the old block without updating file linking table 1030.

Chipset 13 may provide one or more communicative paths among one or more processors 11, memory 12 and other components, such as I/O devices 14. I/O devices 14 may input or output data to or from computing system 1. Examples for I/O devices 14 may comprise a network card, a blue-tooth, an antenna, and possibly other devices for transceiving data.

Other embodiments may implement other technologies for the computing system 1. For example, file linking table 1030 may store physical block addresses rather than logical block addresses. Therefore, block address mapping module 104 may be omitted.

Figure 2:
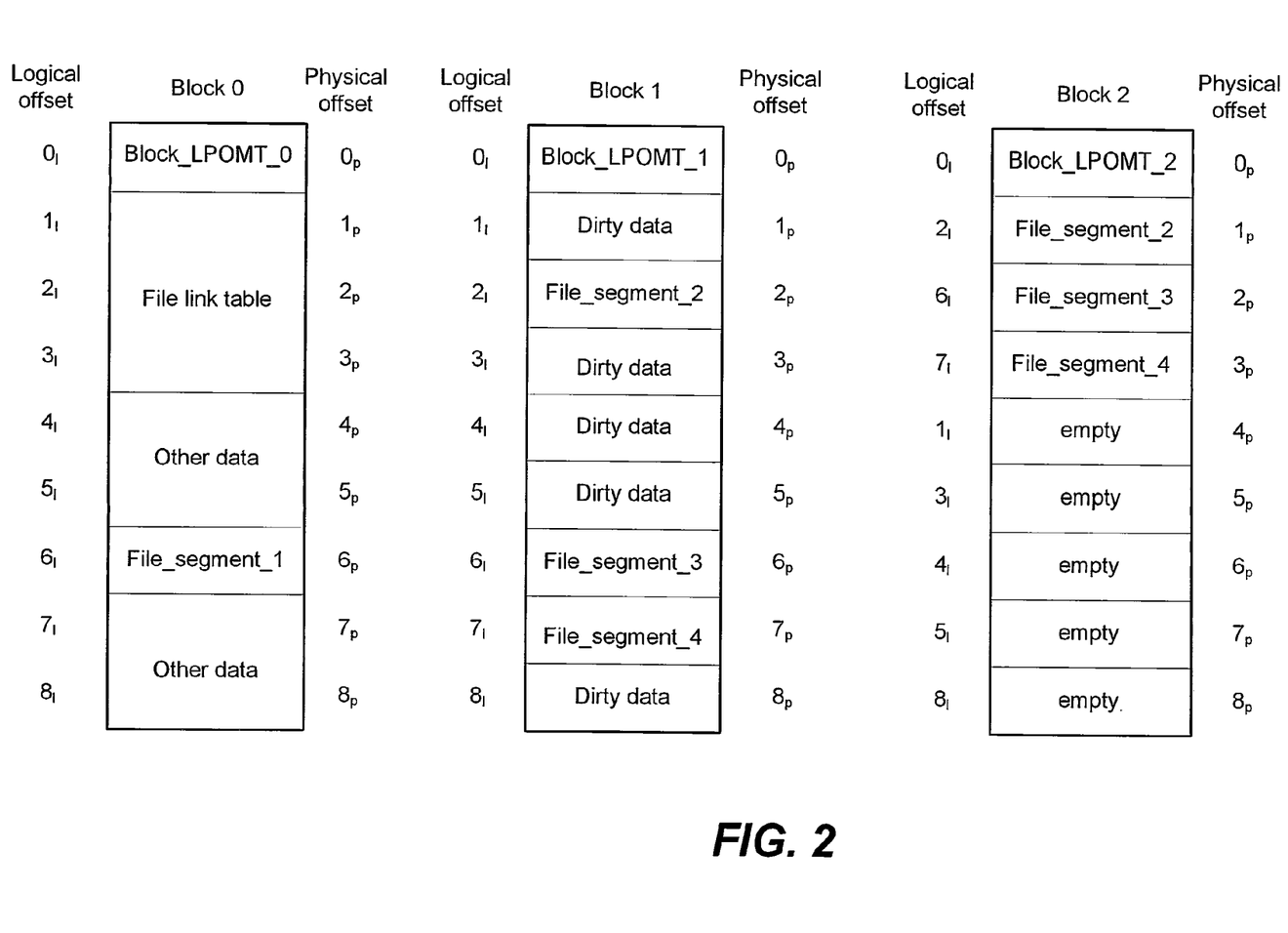
FIG. 2 illustrates an embodiment of the memory system.

FIG. 2 shows an embodiment of the memory system 102. Memory system 102 may comprise a plurality of memory blocks that may be or may not be of the same type. For example, as shown in FIG. 2, memory system 102 may comprise block 0, block 1, block 2 . . . . All of the blocks may be of the same type, such as non-volatile memory blocks. Alternatively, block 0 may be a volatile memory block, while block 1 and block 2 may be non-volatile memory blocks.

Each block may have a plurality of data fragments, and each data fragment may have a physical offset indicating a physical location of the data fragment within the block. In the embodiment of FIG. 2, data fragments locating at the same location within blocks 0-2 may have the same physical offset. For example, third fragments of blocks 0-2 may have the same physical offset each, i.e., $2_p$. Each data fragment may further have a logical offset specifying a logical location of the data fragment within the block. In the embodiment of FIG. 2, the same set of logical offsets (i.e., $0_l, 1_l, 2_l \ldots 8_l$) may be used for each block 0-2 for simplicity of description.

File 101 may have a plurality of file segments, such as file_segment_1, file_segment_2, file_segment_3 and file_segment_4. Each file segment may be stored in different data fragments of the memory system 12. For example, file_fragment_1 may be stored in the seventh fragment of block 0, file_fragment_2 may be stored in the third segment of block 1, file_fragment_3 may be stored in the seventh fragment of block 1 and file_fragment_4 may be stored in the eighth fragment of block 1.

Therefore, the file linking table may be established to link the file segments together by storing addresses of those fragments. As stated above, the file linking table may store logical block address and logical offset for each data fragment storing the file. In order to obtain a physical block address based upon the logical block address, the logical-to-physical block address mapping table (LPBAMT) may be established to map the logical address to the physical address for each block having a data fragment storing the file.

In order to obtain a physical offset based upon the logical offset, a logical-to-physical offset mapping table (LPOMT) may be established for each block storing the file, such as LPOMT_0 for block 0 (FIG. 5A) and LPOMT_1 for block 1 (FIG. 5B).

If block 1 stores dirty data (e.g., invalid data), block 2 may be assigned to replace block 1. Before reclaiming block 1, one or more data fragments of block 2 may be randomly selected to store the file segments copied from block 1. For example, second, third and fourth blocks of block 2 may be selected to respectively store file_segment_2, file_segment_3 and file_segment_4 copied from third, seventh and eighth fragments of block 1.

Then, logical offsets may be assigned for each data fragments of block 2. It can be seen that same logical offsets of the third, seventh and eighth fragments of block 1 may be assigned to the second, third and fourth fragments of block 2. Then, a LPOMT may be established for block 2 (e.g., LPOMT_2 in FIG. 5C) to map a logical offset to a physical offset for each data fragment of block 2. Furthermore, the LPBAMT may be updated to changing the physical address of block 1 into the physical address of block 2.

After copying the file segments from block 1 to block 2, block 1 may be erased and block 2 may replace block 1 without changing the file linking table. Due to the flexibility of selecting the fragments of block 2 to store file data, the memory system as shown in FIG. 2 can save space for the type of memory having sequential addressing constraint (e.g., NAND memory) by selecting sequential fragments of block 2 to store file data and leaving the remaining fragments empty.

Other embodiment may implement other technologies to the memory system of FIG. 2. For example, different sets of logical offsets may be used for different blocks as long as two data fragments from two blocks that may store the same file segment use the same logical offset.

Figure 6:
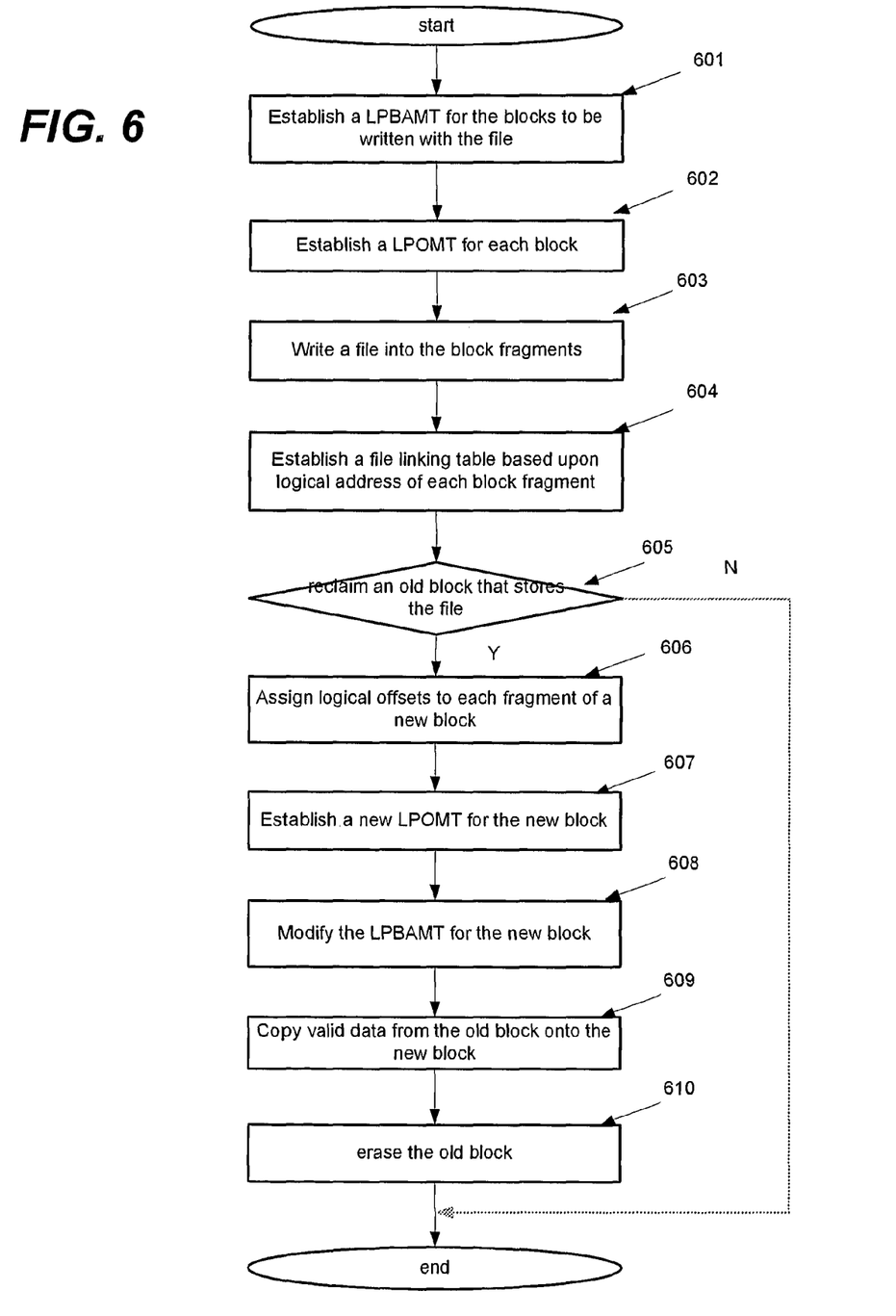
FIG. 6 illustrates an embodiment of a method of reclaiming an old memory block from the memory system.

FIG. 6 illustrates an embodiment of a method of writing file 101 on the blocks of memory system 12 and reclaiming an old block storing file 101 from the memory system 12. As shown, in block 601, block address mapping module 104 may establish a LPBAMT for all of the blocks to be written with file 101 (e.g., blocks 0 and 1). The LPBAMT may map a logical block address to a physical block address for each of the blocks. In block 602, offset mapping module 105 may establish a LPOMT for the each block, e.g., LPOMT_0 for block 0 and LPOMT_1 for block 1. The LPOMT may map a logical offset to a physical offset for each data fragment of the block.

In block 603, different segments of file 101 may be written into different data fragments of the blocks, e.g., seventh fragment of block 0, third fragment, seventh fragment and eighth fragment of block 1. In block 604, file linking module 103 may establish a file linking table to link the file segments together by storing logical addresses of the data fragments storing the file, including logical addresses of the blocks and logical offsets of the data fragments within the blocks.

In block 605, it is determined whether to reclaim an old block (e.g., block 1) storing file 101 from the memory system 12. In response to reclaiming the old block, in block 606, a new block (e.g., block 2) may be assigned to replace the old block and logical offset assigning module 106 may assign a logical offset for each fragment of the new block. As stated above, if a new fragment from the new block is selected to store the file data copied from an old fragment of the old block, logical offset assigning module 106 may assign the same logical offset to the new fragment as that assigned to the old fragment.

In block 607, offset mapping module 105 may establish a new LPOMT for the new block based upon the logical offsets assigned by logical offset assigning module 106. The new LPOMT may map a logical offset to a physical offset for each fragments of the new block. In block 608, block address mapping module 104 may modify the LPBAMT to change the physical address of the old block into the physical address of the new block. In block 609, valid data including file data may be copied from the old block to the new block, and in block 610, the old block may be erased.

Figure 7:
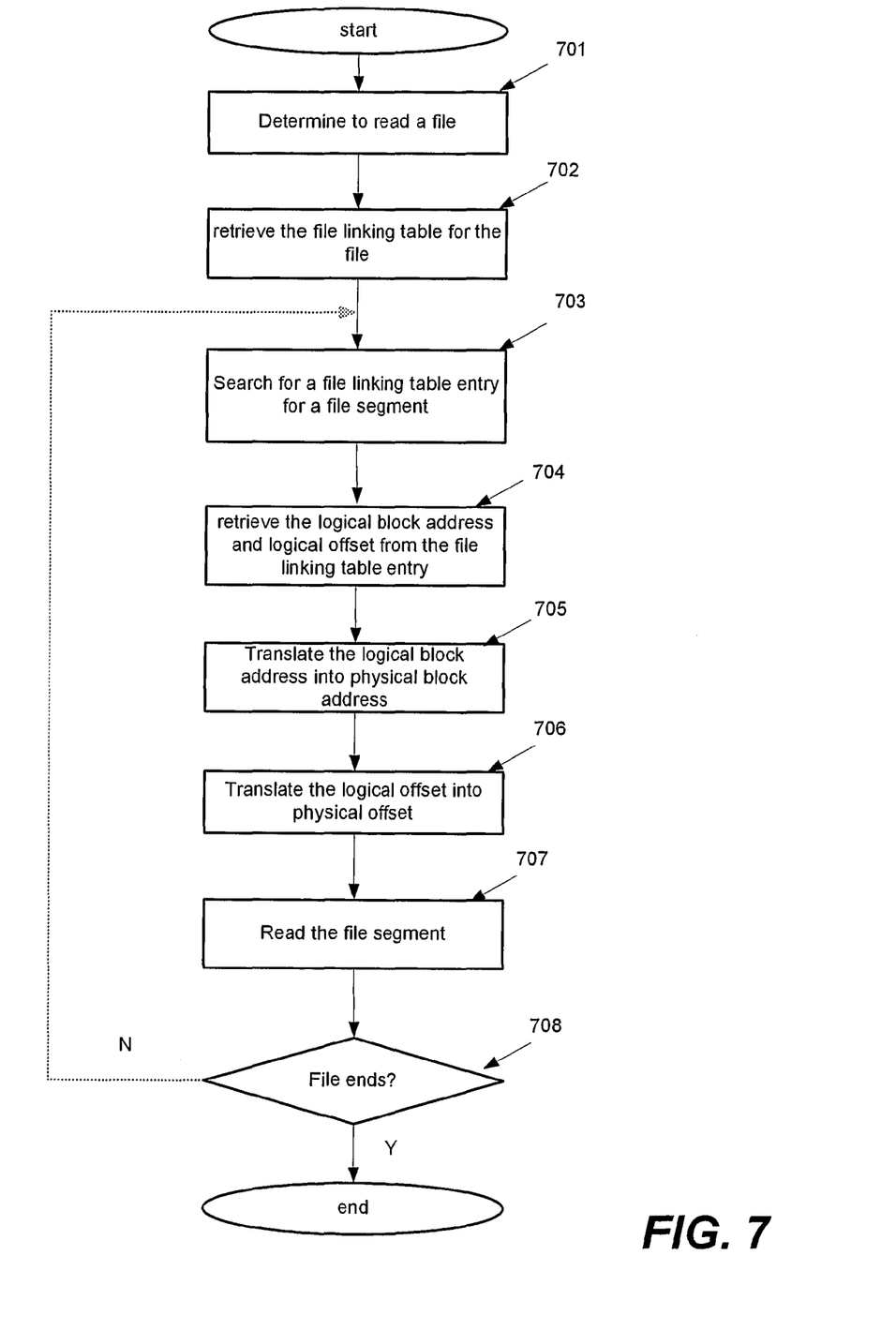
FIG. 7 illustrates an embodiment of a method of reading the file from the memory system.

FIG. 7 illustrates an embodiment of a method of reading file 101 from the memory system 12. In block 701, it is determined to read file 101 from the memory system 12. In block 702, file linking table module 103 may retrieve the file linking table for file 101. In block 703, file linking table module 103 may search the file linking table for an entry for a file segment stored on a data fragment of a block. In block 704, file linking table module 103 may retrieve a logical block address for the block and a logical offset for the data fragment from the file linking table entry.

In block 705, block address mapping module 104 may translate the logical block address retrieved from the file linking table into the physical block address based upon the LPBAMT. In block 706, offset mapping module 105 may translate the logical offset retrieved from the file linking table into the physical offset based upon the LPOMT. In block 707, file manager 102 may read the file segment stored in the data fragment indicated by the physical block address and the physical offset. Then, in block 708, it is determined whether the file segment is the last one of file 101. In response that the file segment is not the last one, the above-stated blocks 703-707 may be implemented once again in order to read another file segment.

Although the present invention has been described in conjunction with certain embodiments, it shall be understood that modifications and variations may be resorted to without departing from the spirit and scope of the invention as those skilled in the art readily understand. Such modifications and variations are considered to be within the scope of the invention and the appended claims.

What is claimed is:

1. A method, comprising:
assigning a first plurality of logical offsets to a first plurality of fragments of a first memory block, the first plurality of fragments comprising a first fragment that stores data, the first plurality of logical offsets comprising a first logical offset that is assigned to the first fragment;
establishing a file linking table to store a first logical address of the first memory block and the first logical offset of the first fragment;
assigning a second plurality of logical offsets to a second plurality of fragments of a second memory block, the second plurality of fragments comprising a second fragment that is associated with the first fragment, the second plurality of logical offsets comprising a second logical offset which is assigned to the second fragment and which is identical to the first logical offset
copying the data from the first fragment to the second fragment; and
erasing the first memory block without affecting the file linking table.

2. The method of claim 1, further comprising:
establishing a first offset mapping table for the first memory block, the first offset mapping table mapping the first logical offset to a first physical offset of the first fragment; and
establishing a second offset mapping table for the second memory block, the second offset mapping table mapping the second logical offset to a second physical offset of the second fragment.

3. The method of claim 1, further comprising:
establishing a block address mapping table to map a first logical address to a first physical address of the first memory block.

4. The method of claim 3, further comprising:
changing the first physical address in the block address mapping table into a second physical address of the second memory block.

5. The method of claim 1, further comprising:
obtaining a first logical address of the first memory block and the first logical offset of the first fragment;
translating the first logical address into a first physical address of the first memory block; translating the first logical offset into a first physical offset of the first fragment; and
reading the data from the first fragment.

6. The method of claim 1, further comprising:
obtaining a first logical address of the first memory block and the first logical offset of the first fragment;
translating the first logical address into a second physical address of the second memory block;
translating the first logical offset into a second physical offset of the second segment; and reading the data from the second fragment.

7. The method of claim 1, wherein the first memory block and the second memory block are non-volatile memory blocks.

8. A non-transitory machine-readable medium comprising a plurality of instructions which when executed result in a system:
assigning a first plurality of logical offsets to a first plurality of fragments of a first memory block, the first plurality of fragments comprising a first fragment that stores data, the first plurality of logical offsets comprising a first logical offset that is assigned to the first fragment;

establishing a file linking table to store a first logical address of the first memory block and the first logical offset of the first fragment;

assigning a second plurality of logical offsets to a second plurality of fragments of a second memory block, the second plurality of fragments comprising a second fragment that is associated with the first fragment, the second plurality of logical offsets comprising a second logical offset which is assigned to the second fragment and which is identical to the first logical offset;

copying the data from the first fragment to the second fragment; and erasing the first memory block without affecting the file linking table.

9. The machine-readable medium of claim 8, wherein the plurality of instructions further result in the system:

establishing a first offset mapping table for the first memory block, the first offset mapping table mapping the first logical offset to a first physical offset of the first fragment; and establishing a second offset mapping table for the second memory block, the second offset mapping table mapping the second logical offset to a second physical offset of the second fragment.

10. The machine-readable medium of claim 8, wherein the plurality of instructions further result in the system:

establishing a block address mapping table to map a first logical address to a first physical address of the first memory block.

11. The machine-readable medium of claim 10, wherein the plurality of instructions further result in the system:

changing the first physical address in the block address mapping table into a second physical address of the second memory block.

12. The machine-readable medium of claim 8, wherein the plurality of instructions further result in the system:

obtaining a first logical address of the first memory block and the first logical offset of the first fragment;

translating the first logical address into a first physical address of the first memory block;

translating the first logical offset into a first physical offset of the first fragment; and reading the data from the first fragment.

13. The machine-readable medium of claim 8, wherein the plurality of instructions further result in the system:

obtaining a first logical address of the first memory block and the first logical offset of the first fragment;

translating the first logical address into a second physical address of the second memory block;

translating the first logical offset into a second physical offset of the second segment; and reading the data from the second fragment.

14. The machine-readable medium of claim 8, wherein the first memory block and the second memory block are non-volatile memory blocks.

* * * * *

UNITED STATES PATENT AND TRADEMARK OFFICE
CERTIFICATE OF CORRECTION

PATENT NO. : 8,510,533 B2
APPLICATION NO. : 12/517062
DATED : August 13, 2013
INVENTOR(S) : Hongyu Wang Page 1 of 1

It is certified that error appears in the above-identified patent and that said Letters Patent is hereby corrected as shown below:

In the Claims

In column 6, line 21, in claim 1, delete "offset" and insert -- offset; --, therefor.

Signed and Sealed this
Nineteenth Day of August, 2014

Michelle K. Lee
*Deputy Director of the United States Patent and Trademark Office*